(12) United States Patent
Schumann

(10) Patent No.: US 6,675,992 B2
(45) Date of Patent: Jan. 13, 2004

(54) GREASE GUN FOR A MOTOR DRIVE

(76) Inventor: Axel Schumann, Am Kumb 20, Otterbach (DE), D-67731

( * ) Notice: Subject to any disclaimer, the term of this patent is extended or adjusted under 35 U.S.C. 154(b) by 96 days.

(21) Appl. No.: 10/114,378

(22) Filed: Apr. 1, 2002

(65) Prior Publication Data
US 2003/0183648 A1 Oct. 2, 2003

(51) Int. Cl.[7] .................................................. B67D 5/42
(52) U.S. Cl. .................... 222/390; 222/63; 222/504; 222/263; 184/105.2
(58) Field of Search ............................... 222/390, 256, 222/257, 261, 262, 263, 333, 63, 52, 325, 326, 327, 504, 149; 184/105.2, 26, 33, 27.1

(56) References Cited

U.S. PATENT DOCUMENTS

| | | | | |
|---|---|---|---|---|
| 786,357 A | * | 4/1905 | Hanson | 184/37 |
| 811,917 A | * | 2/1906 | Hanson | 184/37 |
| 852,039 A | * | 4/1907 | Schroyer | 184/37 |
| 1,743,968 A | * | 1/1930 | Hatfield | 417/401 |
| 2,175,522 A | * | 10/1939 | Ginter | 222/262 |
| 2,542,390 A | * | 2/1951 | Brown | 137/625.48 |
| 3,384,274 A | * | 5/1968 | Lundvall | 222/390 |
| 4,257,540 A | * | 3/1981 | Wegmann et al. | 222/262 |
| 5,271,528 A | | 12/1993 | Chien | |
| 5,292,036 A | * | 3/1994 | Thome | 222/333 |
| 5,971,229 A | | 10/1999 | May et al. | |

FOREIGN PATENT DOCUMENTS

| | | | | |
|---|---|---|---|---|
| DE | 19941894 A1 | * | 4/2001 | F16N/5/00 |
| DE | 20101900 | | 5/2001 | |
| EP | 0666449 | | 8/1995 | |
| FR | 2732625 | | 10/1996 | |

* cited by examiner

Primary Examiner—Gene Mancene
Assistant Examiner—Frederick C. Nicolas
(74) Attorney, Agent, or Firm—Richard M. Goldberg

(57) ABSTRACT

A grease gun for lubricating machines, includes a housing having an inlet opening for receiving grease therethrough into the housing and an extrusion opening through which the grease is pushed out to a machine to be lubricated; a drive shaft rotatably mounted in the housing and having an outer surface with external threads thereon; a conveying piston mounted in the housing and partially surrounding the drive shaft, the conveying piston having internal threads for engaging with the threads on the drive shaft; a reversible drive motor rotating the drive shaft so as to cause the piston to move toward and away from the extrusion opening; and a seal associated with the conveying piston for sealing the inlet opening when the piston is moved toward the extrusion opening.

12 Claims, 1 Drawing Sheet

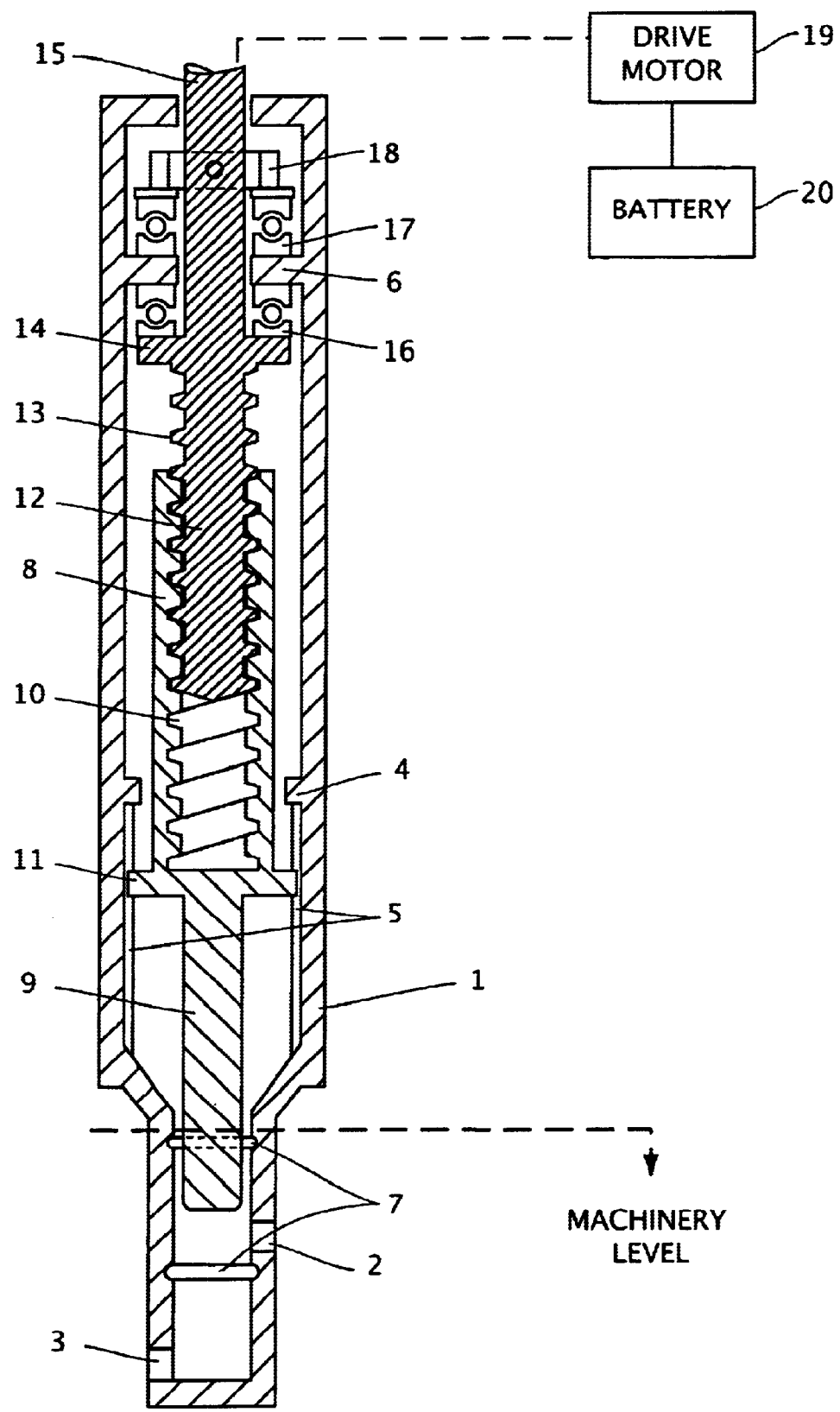

GREASE GUN FOR A MOTOR DRIVE

BACKGROUND OF THE INVENTION

The invention together with the attached drawing relates to a further development of manually operated grease guns for lubricating machines, especially agricultural machines and construction equipment.

Such a grease gun, which is also referred to as a manually operated grease gun, is known from the EP 0 666 449 B1. Grease guns of this construction are operated with one or two hands and require the expenditure of appreciable force, especially when a larger number of lubricating sites are to be supplied. This is especially the case for construction equipment and agricultural machines, for which maintenance must be carried out not in the workshop, but after each shift at the respective work site under unfavorable conditions.

SUMMARY OF THE INVENTION

It is an object of the invention to facilitate the lubricating process by means of a motor-driven grease gun, it being possible to provide the inventive device with a motor, which is permanently connected with the device, and an attachment, for example, an electrically driven drill, capable of rotating clockwise or counter-clockwise and battery-operated or mains-operated.

Battery-operated drills, when used pursuant to this invention and in combination with a conveying piston with a diameter of 10 mm, enable a larger number of lubricating sites to be supplied with a pressure of up to approximately 500 hPa with one charge of the battery.

Exchangeable batteries can be charged from the D.C. power supply system installed on the machine using a suitable transformer. Moreover, this invention can be combined easily with a lamp for illuminating the site to be lubricated.

The work of lubricating machines at sites, which often are difficult to access, is frequently physically taxing. With the invention described, this work can be clearly facilitated and accelerated, so that the availability of the machine is increased and the state of care improved. This is the case all the more so, since the device weighs less, is smaller and more easily handled and, especially when constructed as a combined device, can be produced very inexpensively and is more reliable in operation.

Pursuant to the invention, the pressure on the conveying piston is generated by a heavy-duty thread. This heavy-duty thread, preferably a saw tooth thread, is an internal thread, which is formed in a unit, which is named a driving sleeve pursuant to the invention, and with which the driving piston is firmly connected. Moreover, the heavy-duty thread is guided in a frame or housing and prevented from rotating by side stops.

In a further development of the inventive concept, a drive shaft runs, which is equipped with a complementary thread and, outside of the frame or housing, is constructed round or polygonally for taking up the drive motor. This drive shaft, which, aside from the frame/housing and the drive sleeve, represents the three main parts of the motor-driven grease gun, is to be provided with an annular stop for the thrust race, which lies on the opposite side of a stop, which is permanently mounted in the frame/housing. The construction of the thrust race must be such that, together with the stop of the housing, it can transmit the pressures, which arise, reliably and must, preferably be a thrust bearing.

The tensile forces, which arise during the suction cycle of the conveying piston, are also absorbed by a bearing constructed as a thrust bearing, which also acts on the stop of the housing/frame, however from the opposite side. This bearing is adjusted and fixed on the drive shaft in such a manner that, with the exception of the bearing clearance, the drive shaft is rotatable but not displaceable in the axial direction within the frame/housing.

In a further development of this inventive concept, the drive shaft, for structural or economic reasons, can be constructed with the drive sleeve and complementary to the conveying piston with the external thread.

Pursuant to a further development of the inventive concept, in the case of a drive, which is permanently connected with this grease gun, an electrical or mechanical reversal of the direction of rotation is provided at the ends of the path of the conveying piston; when a "drilling screw driver" or drill, the direction of rotation of which can be reversed, is used, the reversal of the direction of rotation can be carried out manually.

Moreover, in pursuing the inventive concept, limiting the torque in order to avoid damaging the heavy-duty thread for the compression cycle as well as the suction cycle is regarded as advantageous.

In a further development of the inventive concept, the grease gun for a motor drive can be used for plastic or viscous compositions.

BRIEF DESCRIPTION OF THE DRAWING

An example of the invention is explained in greater detail in the following by means of the drawing.

The single FIGURE is a longitudinal cross-sectional view of the grease gun according to the present invention.

DETAILED DESCRIPTION

In the drawing, 1 is the housing or frame, 2 is the suction opening, 3 is the extrusion opening, 4 is the longitudinal stop, 5 are the transverse stops for the rotation arrester of the drive sleeve, 6 is the bearing seat, 7 are O-rings, 8 is the drive sleeve with conveying piston, 9 is the conveying piston, 10 is the internal heavy-duty thread of the drive sleeve, 11 is the rotation arrester which functions as a longitudinal stop for the drive sleeve, 12 is the drive shaft, 13 is the external heavy-duty thread, 14 is the stop for the thrust race, 15 is the connecting piece for the connecting motor, 16 is the thrust race, 17 is the tension bearing, 18 is the bearing arrester, 19 is the drive motor and 20 is the battery for powering the drive motor.

By rotating the drive shaft 12 at the connecting piece 15 by means of the motor 19 which is powered by battery 20, the drive sleeve 8 with the conveying piston 9 is moved alternatively between the two end points for the suction cycle and the extrusion cycle over the external heavy-duty thread 13 of the drive shaft 12 and the internal heavy-duty thread 10 of the drive sleeve 8 connected with piston 9.

In each case, when the end point of the conveying piston 9 is reached, the direction of rotation of the drive shaft 12 is changed either manually or automatically, depending on the construction of the drive at the connecting piece for the motor drive 15.

By these means, the drive sleeve 8 with the conveying piston 9 is moved forward or backward over the external heavy-duty thread 13 of the drive shaft 12 and the internal heavy-duty thread 10 of the drive sleeve 8. The drive sleeve 8 with the conveying piston 9 is prevented from rotating along by the transverse stops 5 at either side of the frame/housing 1 and by the rotation arresters 11 of the drive sleeve 8.

The external heavy-duty thread 13 of the drive shaft 12 is prevented from rotating out of the internal heavy-duty thread 10 of the drive sleeve 8 by the longitudinal stops 4 at the frame/housing 1 and the rotation arrester 11, which is constructed, at the same time, as a longitudinal stop 11.

The thrust race 16 transfers the counter-pressure of the conveying piston 9 from the stop for the thrust race 14 to the bearing seat 6 of the frame/housing 1 during the expulsion stroke. During the suction stroke of the conveying piston 9, the tension of the drive shaft 12, which arises from the winding into the non-rotating drive shaft 8 with the conveying piston 9, is transferred over the arrester of the tension bearing 18 and the tension bearing 17 to the bearing seat 6 of the frame/housing 1.

The thrust race 16 and the tension bearing 17 are constructed as thrust bearings.

In operation, inlet opening 2 communicates with a cartridge of the type shown in EP 0 666 449 in which grease is held under a certain pressure. When piston 9 is withdrawn, as shown in the drawing, grease is sucked and squeezed in through inlet opening 2. Then, by pushing piston 9 forward, inlet opening 2 is closed off with seal rings 7, and the grease is pressed out through the outlet opening 3.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

What is claimed is:

1. A grease gun for lubricating machines, comprising:
   a housing having an inlet opening for receiving grease therethrough into the housing and an extrusion opening through which the grease is pushed out to a machine to be lubricated;
   a drive shaft rotatably mounted in the housing;
   a conveying piston mounted in the housing;
   one of the drive shaft and conveying piston partially surrounding the other of said drive shaft and conveying piston, the other of the drive shaft and conveying piston having an outer surface with external threads thereon and the one of the drive shaft and conveying piston having internal threads for engaging with the external threads on the other of the drive shaft and conveying piston;
   a reversible drive motor rotating said drive shaft so as to cause said piston to move toward and away from said extrusion opening; and
   a seal associated with the conveying piston for sealing the inlet opening when the piston is moved toward said extrusion opening.

2. The grease gun of claim 1, wherein the housing is pressure resistant and tension resistant.

3. The grease gun of claim 1, wherein the conveying piston includes a drive sleeve which partially surrounds said drive shaft and which includes said internal threads thereon.

4. The grease gun of claim 3, wherein the housing further includes an internal longitudinal stop, and wherein the drive sleeve and conveying piston are movable in an axial direction thereof between an end of the housing at the extrusion opening and the longitudinal stop.

5. The grease gun of claim 1, further comprising an arrangement for preventing rotation of the conveying piston, said arrangement including a rotation arrester on an inner wall of said housing and a transverse stop on said conveying piston which is restrained from rotation by said rotation arrester.

6. The grease gun of claim 1, further including:
   a stop formed on the drive shaft;
   a bearing seat formed at an inner wall of the housing; and
   a thrust race which transfers counter-pressure of the conveying piston from the stop to the bearing seat during an expulsion stroke.

7. The grease gun of claim 6, further comprising a tension bearing surrounding the drive shaft and a bearing arrester mounted on the drive shaft for engagement with the tension bearing during a suction stroke of the conveying piston; and
   wherein the drive shaft with the stop formed thereon, is rotatable with respect to the thrust race and the tension bearing.

8. The grease gun of claim 8, wherein the thrust race and the tension bearing are supported on the bearing seat.

9. The grease gun of claim 7, wherein the tension bearing is secured against axial displacements by the bearing arrester.

10. The grease gun of claim 9, wherein the bearing arrester is adjustably movable to different positions along the drive shaft.

11. The grease gun of claim 1, further comprising a connecting piece connected with said drive shaft, and wherein the motor is an electric motor connected with the connecting piece.

12. The grease gun of claim 1, wherein the internal threads on the conveying piston and the external threads on the drive shaft are heavy-duty threads.

* * * * *